(12) United States Patent
Fails et al.

(10) Patent No.: US 10,855,773 B1
(45) Date of Patent: Dec. 1, 2020

(54) COMBINING RDM ENTITIES IN A DMX CONTROLLED DEVICE

(71) Applicant: City Theatrical, Inc., Carlstadt, NJ (US)

(72) Inventors: Gary Fails, Tappan, NY (US); Paul Kleissler, Englewood, NJ (US); Philip Nye, Bournemouth (GB)

(73) Assignee: CITY THEATRICAL, INC., Carlstadt, NJ (US)

( * ) Notice: Subject to any disclaimer, the term of this patent is extended or adjusted under 35 U.S.C. 154(b) by 0 days.

(21) Appl. No.: 16/458,717

(22) Filed: Jul. 1, 2019

Related U.S. Application Data

(60) Provisional application No. 62/747,743, filed on Oct. 19, 2018.

(51) Int. Cl.
*H05B 33/00* (2006.01)
*H04L 29/08* (2006.01)
*H05B 47/19* (2020.01)

(52) U.S. Cl.
CPC .......... *H04L 67/125* (2013.01); *H04L 69/323* (2013.01); *H05B 47/19* (2020.01)

(58) Field of Classification Search
CPC ............ H05B 37/0218; H05B 37/0254; H05B 33/0854; H05B 37/0263; H05B 37/0272; H05B 33/0815; H05B 33/0863; H05B 33/0842; H05B 37/0227; H05B 37/0281
See application file for complete search history.

(56) References Cited

U.S. PATENT DOCUMENTS

| | | | |
|---|---|---|---|
| 2016/0183351 A1* | 6/2016 | Snyder | .................... H04L 12/10 315/152 |
| 2019/0141800 A1* | 5/2019 | Rhodes | .............. H05B 33/0806 |

\* cited by examiner

*Primary Examiner* — Monica C King
(74) *Attorney, Agent, or Firm* — Myers Wolin, LLC

(57) ABSTRACT

An end device having a controller and a method for controlling the end device are provided. The end device has a host module for processing commands received at the end device and for applying commands received to the end device, a radio module for receiving wireless communications to be provided to the host module as commands and for receiving wired communications to be provided to the host module as commands, and a DMX module for receiving wired communications to be provided to the host module as commands. When wired communications are received at the DMX module, those communications are provided to the radio module for relaying to the host module as a command. A method is provided for controlling the end device described.

12 Claims, 2 Drawing Sheets

COMBINING RDM ENTITIES IN A DMX CONTROLLED DEVICE

CROSS REFERENCE TO RELATED APPLICATIONS

This application claims the benefit of provisional application 62/747,743, filed Oct. 19, 2018, the entire contents of which is incorporated herein by reference.

FIELD OF THE INVENTION

This disclosure relates to lighting fixtures having both wired DMX and wireless RDM data interfaces.

BACKGROUND

RDM, or Remote Device Management, is a wireless protocol for configuring and monitoring a wide variety of products. Generally used in the entertainment and architectural industries, the RDM protocol can be used for configuring and monitoring lighting equipment. Stage lighting for shows and concerts are one common implementation of RDM.

RDM is a protocol enhancement to the DMX512 standard, which is a traditional digital multiplexed standard for digital communication networks for stage lighting and effects.

RDM was initially designed to work with existing DMX devices, and the use of RDM requires a DMX based configuration and status to control addressing of the associated lighting device to a particular DMX512 universe of data slots. As wireless technology has become less expensive, lighting manufacturers have purchased add on chips, including radios, to incorporate wireless capabilities into existing DMX based fixtures. Such an approach has resulted in lighting fixtures with two independent interfaces, one accessible by way of an XLR-5 connector, and the other being accessible by way of the radio on an RF based RDM chip.

A typical implementation of RDM in a lighting fixture 100 is shown in FIG. 1. As shown, RDM based instructions from a controller are ultimately executed by a host module 110. Such RDM instructions may be by way of an RF module 120 or a traditional DMX module 130. The DMX module 130 receives communications from a traditional wired control interface, such as by way of an XLR-5 control interface 150, and the RF module 120 receives communications from a wireless control interface 140.

When users set up and configure RDM devices having both wired 150 and wireless 140 interfaces, each of the independent interfaces appear in software implementations as independent lighting entities, corresponding with the DMX module 130 and RF module 120 respectively. This results in confusion when using existing monitoring and configuration software to set up and configure the system, as each interface for the lighting fixture may appear as an independent and unrelated RDM entity.

Further, as the RDM interface for the radio and the DMX interface for the underlying fixture may be provided with independent configurations and status data, a user may accidentally program an unused interface of a particular lighting fixture, resulting in a failure of the fixture to respond when necessary.

Further, because there are benefits to using each of the wireless and wired interfaces for controlling a fixture by way of RDM protocols, users may wish to switch back and forth between the two interfaces, depending on needs in a specific instance. However, if the wired and wireless interfaces are separately configured, such transitions are difficult and costly.

Further, lighting installations can include hundreds of fixtures, or more, each of which could appear, by default, as multiple lighting fixtures. Because this traditional implementation then results in double the number of RDM entities in software interfaces, it is overly complex and cumbersome to identify and monitor the setup of wireless control for each lighting fixture in an installation.

Platforms exist that mask the distinct interfaces in software by forcing the multiple interfaces to appear as a single interface with a single RDM controller. However, this is artificial, resulting in errors and complications. Further, such benefits disappear if a user switches to a different RDM controller.

There is a need for a lighting fixture in which the RDM based radio and the underlying DMX based lighting fixture are accessible by way of a single unified interface, thereby allowing for quicker and more efficient setup and use, and fewer opportunities for error.

SUMMARY

An end device, such as a lighting fixture, is provided having a controller. The end device has a host module for processing commands received at the end device and for applying commands received to the end device, a radio module for receiving wireless communications to be provided to the host module as commands and for receiving wired communications to be provided to the host module as commands, and a DMX module for receiving wired communications to be provided to the host module as commands. When wired communications are received at the DMX module, those communications are provided to the radio module for relaying to the host module as a command.

Typically, the radio module interfaces with the host module, and the DMX module does not interface with the host module.

In some embodiments, the radio module is provided with configuration and status data, and the DMX module merely passes data received at an XLR-5 connector to the radio module. Accordingly, all configuration and monitoring functions of the end device may be managed by way of the radio module.

In some embodiments, the messages received at the radio module are in the form of RDM data and are decoded at the radio module prior to transmitting the corresponding communications to the host module. In some embodiments, configuration and monitoring data for the end device is maintained by the radio module.

A method is also provided for controlling the end device described. In such a method, the end device may receive, at a DMX module, a first communication by way of a first wired interface. The first communication may then be transmitted by way of a second wired interface, to a radio module.

The first communication may then be transmitted, by way of a third wired interface from the radio module to a host module. The host module may then execute instructions contained in the first communication.

A second communication may then be received at the radio module by way of a wireless interface. The second communication may then be transmitted from the radio module to the host module by way of the third wired interface, and the host module may then execute instructions contained in the second communication.

The end device is typically a lighting fixture, and the lighting fixture may be controllable by either the wireless interface or the first wired interface.

In some embodiments, all configuration and monitoring of the end device is by way of radio module.

In some embodiments, the first communication and the second communication are both RDM communications.

In some embodiments, the first communication and the second communication are each decoded at the radio module prior to transmitting the corresponding communication from the radio module to the host module.

DETAILED DESCRIPTION OF THE PREFERRED EMBODIMENTS

Figure 1:
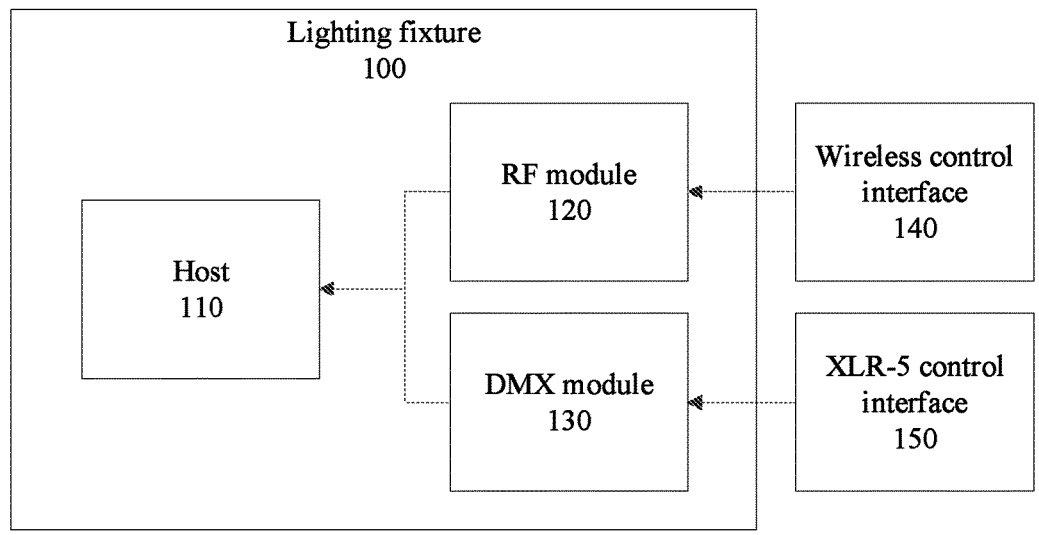
FIG. 1 is a schematic diagram for an existing lighting fixture.

The description of illustrative embodiments according to principles of several illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits are illustrated by reference to certain exemplified embodiments and may not apply to all embodiments. Accordingly, the invention expressly should not be limited to such exemplary embodiments illustrating some possible non-limiting combination of features that may exist alone or in other combinations of features; the scope of the claimed invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

An end device to be controlled by RDM, such as a lighting fixture, as well as a method for controlling an end device by way of an RDM interface, is provided. It will be understood that while the device and method are discussed in terms of a lighting fixture, it can similarly be applied to any device in the entertainment or architectural industries that implements the RDM protocol.

Figure 2:
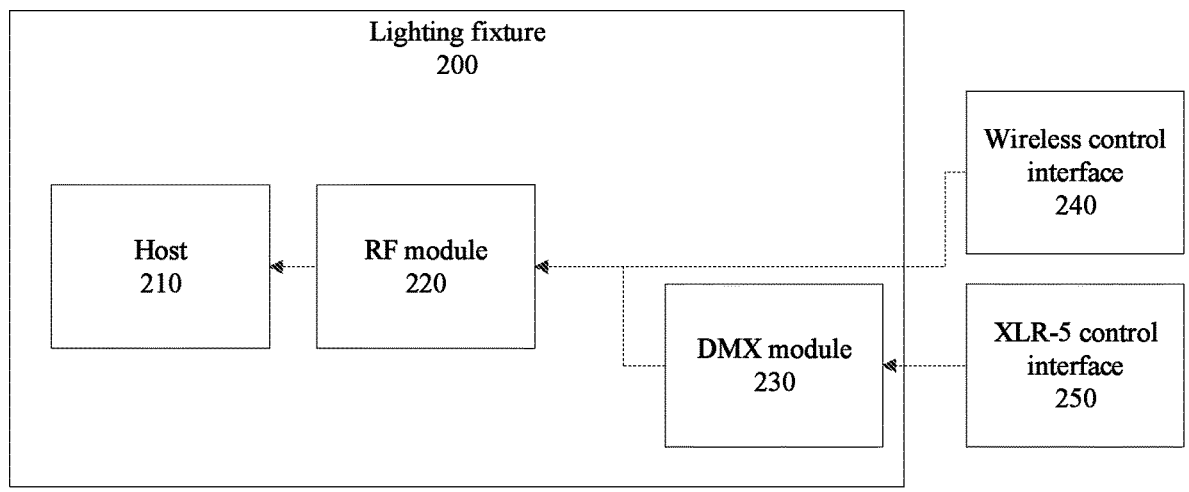
FIG. 2 is a schematic diagram for a lighting fixture in accordance with this disclosure.

FIG. 2 is a schematic diagram for a lighting fixture in accordance with this disclosure. As shown, the end device, in this case a lighting fixture 200 has a host module 210 for processing and executing on any commands received and for applying any commands received to the lighting fixture.

The lighting fixture 200 further comprises a radio module 220 for receiving wireless communications to be provided to the host module 210 as commands. Such wireless communications are typically received by way of a wireless control interface 240.

A DMX module 230 is separately provided for receiving wired communications to be provided to the host module 210 as commands. Such wired communications are typically received by way of a traditional wired interface, such as an XLR-5 control interface 250. However, the DMX module 230 does not have any direct connection to the host module 210 instead transmitting all communications intended for the host module to the radio module 220.

Accordingly, the radio module 220 may receive both wireless communications by way of a wireless control interface 240 and wired communications from the XLR-5 control interface 250 by way of the DMX module 230. In this way, the radio module 220 interfaces directly with the host module 210, but the DMX module 230 does not interface directly with the host module 210.

In some embodiments, the DMX module 230 does not process data at all, and instead simply relays all communications received by way of the XLR-5 control interface 250 directly to the radio module 220. Accordingly, all configuration and monitoring functions of the lighting fixture 200 are by way of the radio module 220.

Typically, the communications ultimately received at the radio module 220 are decoded at the radio module and presented to the host module 210 for execution. Further, because the radio module 220 is the terminus for both wired and wireless communications, the host module 210 need only tell the radio module what to use. Further, since the radio module 220 handles all inputs, it can directly present all configurations and monitoring as a single combined entity from the perspective of the user.

It will be understood that while the wired interface is discussed in terms of an XLR-5 control interface 250, any wired control interface may be used. Similarly, while the end device is discussed in terms of a lighting fixture 200, any number of end devices may be controlled by implementing the structure described. Such devices may include lighting fixtures, smoke machines, and mechanical devices, so long as they are controllable by the RDM protocol discussed.

Further, internal communications, such as between the radio module 220 and the DMX module 230 as well as between the radio module and the host module 210, can be implemented using a wide variety of protocols including, for example, inter-integrated circuit ($I^2C$) protocol.

Figure 3:
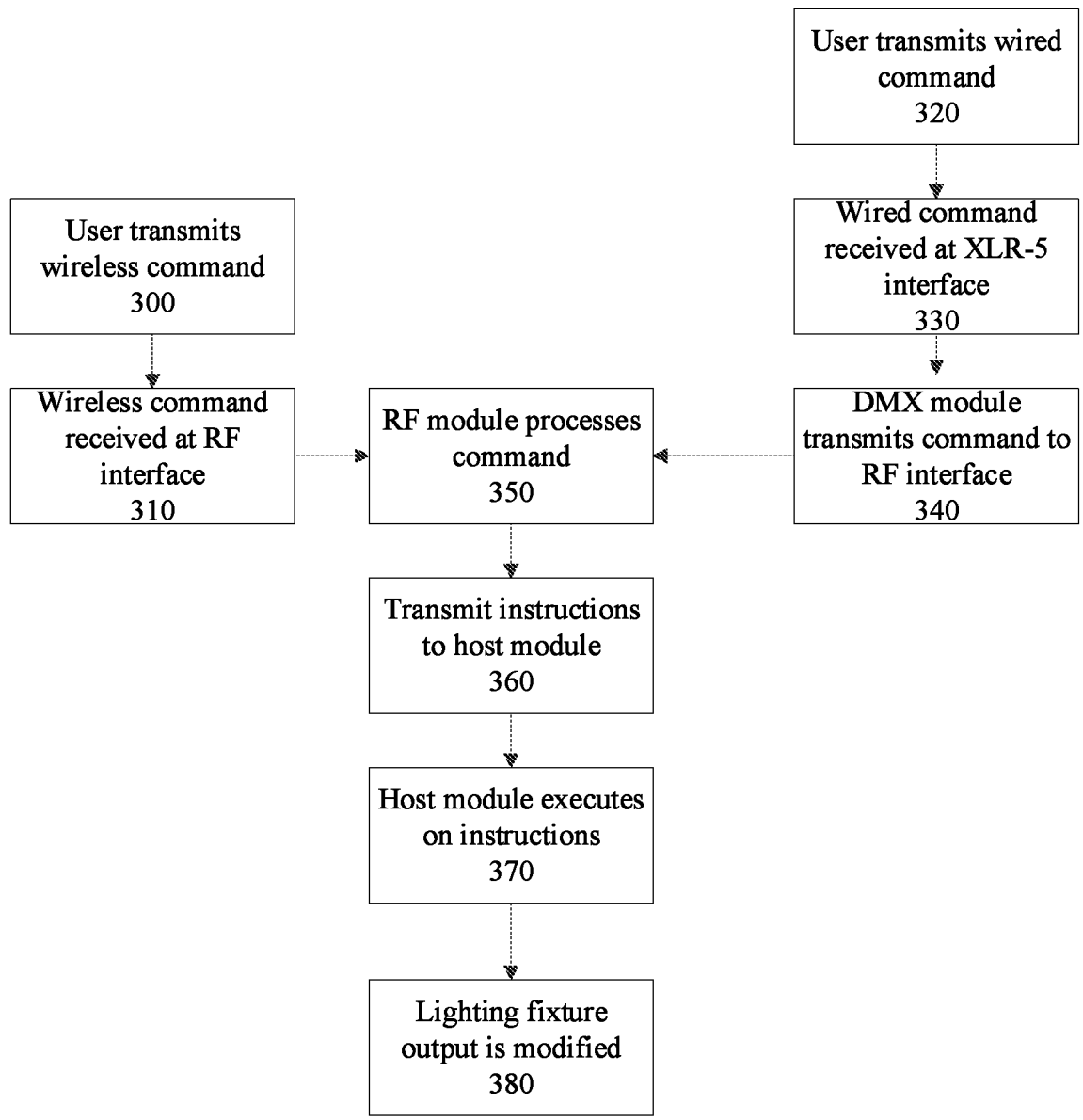
FIG. 3 is a flowchart illustrating a method for controlling a lighting fixture in accordance with this disclosure.

FIG. 3 is a flowchart illustrating a method for controlling a lighting fixture in accordance with this disclosure.

As shown, users may communicate with a lighting fixture 200 in two distinct ways. Users may transmit wireless commands directed towards the lighting fixture 200 (at 300) or users may transmit wired commands at (320). If a user transmits wireless commands (at 300) such command would be retrieved at an RF interface 240 (at 310) which passes the command to the radio module 220 for processing (at 350).

If a user transmits a command by way of a wired interface (at 320), the command would be received at the XLR-5 interface 250 (at 340) which in turn relays the command to the radio module 220 for processing (at 350).

Once at the radio module 220, instructions are decoded and transmitted to the host module 210 (at 360) which then executes on the instructions in the wireless communication (370).

Similarly, if configuration or monitoring data are needed by an end user, such data can be retrieved from the radio module 220 by way of either the XLR-5 wired interface 250 or the wireless control interface 240.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An end device having a controller comprising:
    a host module for processing commands received at the end device and for applying any commands received to the end device;
    a radio module for receiving wireless communications to be provided to the host module as commands and for receiving wired communications to be provided to the host module as commands; and
    a DMX module for receiving wired communications at a first wired interface to be provided to the host module as commands,
    wherein, upon receipt of a wired communication at the DMX module, such wired communication is provided to the radio module by way of a second wired interface for relaying to the host module as a command by way of a third wired interface.

2. The end device of claim 1, wherein the radio module interfaces with the host module by way of the third wired interface, and wherein the DMX module does not directly interface with the host module.

3. The end device of claim 1, wherein the end device is a light fixture.

4. The end device of claim 1, wherein only the radio module is provided with configuration and status data, and wherein the DMX module merely passes data received at an XLR-5 connector to the radio module by way of the second wired interface.

5. The end device of claim 1, wherein all configuration and monitoring functions of the end device are transmitted to the host module from the radio module by way of the third wired interface.

6. The end device of claim 1, wherein RDM data is decoded at the radio module prior to transmitting the corresponding communications to the host module by way of the third wired interface.

7. The end device of claim 1, wherein all RDM configuration and monitoring data for the end device is maintained by the radio module.

8. A method for controlling an end device, the method comprising:
    receiving, at a DMX module, a first communication by way of a first wired interface;
    transmitting the first communication to a radio module by way of a second wired interface linking the DMX module and the radio module;
    transmitting the first communication from the radio module to a host module by way of a third wired interface;
    executing instructions contained in the first communication at the host module;
    receiving, at the radio module, a second communication by way of a wireless interface;
    transmitting the second communication from the radio module to the host module by way of the third wired interface; and
    executing instructions contained in the second communication at the host module.

9. The method of claim 8, wherein the end device is a lighting fixture, and wherein the lighting fixture can be controlled by way of the wireless interface or the first wired interface.

10. The method of claim 8, wherein all configuration and monitoring of the end device is received at the host module from the radio module by way of the third wired interface.

11. The method of claim 8, wherein both the first communication and the second communication are RDM communications.

12. The method of claim 11, wherein the first communication and the second communication are each decoded at the radio module prior to transmitting the corresponding communication from the radio module to the host module by way of the third wired interface.

* * * * *